United States Patent
Weng et al.

(10) Patent No.: US 8,421,749 B2
(45) Date of Patent: Apr. 16, 2013

(54) ELECTRONIC DEVICE WITH PROMPT FUNCTION AND PROMPT METHOD THEREOF

(75) Inventors: Yuh-Hung Weng, Taipei Hsien (TW); Chen-Huang Fan, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 376 days.

(21) Appl. No.: 12/871,835

(22) Filed: Aug. 30, 2010

(65) Prior Publication Data

US 2012/0007798 A1    Jan. 12, 2012

(30) Foreign Application Priority Data

Jul. 12, 2010   (CN) .......................... 2010 1 0223537

(51) Int. Cl.
*G09G 5/00*     (2006.01)
*H04M 1/725*    (2006.01)
*H04M 3/42*     (2006.01)

(52) U.S. Cl.
USPC ...................... 345/156; 455/414.1; 455/412.2

(58) Field of Classification Search .................. 345/156; 455/414.1, 412.2
See application file for complete search history.

(56) References Cited

U.S. PATENT DOCUMENTS

| 2002/0057765 A1* | 5/2002 | Hyziak et al. .................... 379/52 |
| 2003/0224762 A1* | 12/2003 | Lau et al. .................... 455/412.2 |
| 2004/0176107 A1* | 9/2004 | Chadha ....................... 455/456.5 |
| 2004/0203644 A1* | 10/2004 | Anders et al. .............. 455/414.1 |
| 2004/0203847 A1* | 10/2004 | Knauerhase et al. ....... 455/456.1 |
| 2005/0136903 A1* | 6/2005 | Kashima et al. .............. 455/418 |
| 2006/0240867 A1* | 10/2006 | Wang et al. ................ 455/556.1 |
| 2011/0078151 A1* | 3/2011 | Bilbrey ......................... 707/746 |

* cited by examiner

*Primary Examiner* — Ariel Balaoing
(74) *Attorney, Agent, or Firm* — Altis Law Group, Inc.

(57) ABSTRACT

An electronic device with a prompt function includes a display unit, a storage unit, a trigger detecting unit, and a processing unit. The storage unit stores a to-do list recording at least one item and at least one trigger condition. Each of the at least one item is associated with one of the at least one trigger condition. The trigger detecting unit is configured to receive input. The processing unit is configured to compare information of the received input with the at least one trigger condition. If there is a match, the processing unit displays the item associated with the one of the at least one trigger condition on the display unit, and outputs predetermined prompt content. A related prompt method is also provided.

9 Claims, 2 Drawing Sheets

# ELECTRONIC DEVICE WITH PROMPT FUNCTION AND PROMPT METHOD THEREOF

BACKGROUND

1. Technical Field

The present disclosure relates to electronic devices and, particularly, to an electronic device capable of prompting users to do a list of things and a prompt method thereof.

2. Description of Related Art

Electronic devices, such as mobile phones, have a memo function allowing a user to record a list of to-do items. Conventionally, each to-do item is associated with a preset time and a prompt content which will be output to prompt the user when the preset time arrives. However, it is too limiting for a user to only be able to set a time condition to activate a to-do prompt. In certain condition, users may have something they want to be reminded of that is not time conditional, but instead conditional on some other events or environmental conditions.

BRIEF DESCRIPTION OF THE DRAWINGS

The components of the drawings are not necessarily drawn to scale, the emphasis instead being placed upon clearly illustrating the principles of an electronic device with a prompt function and a prompt method thereof. Moreover, in the drawings, like reference numerals designate corresponding parts throughout several views.

DETAILED DESCRIPTION

Figure 1:
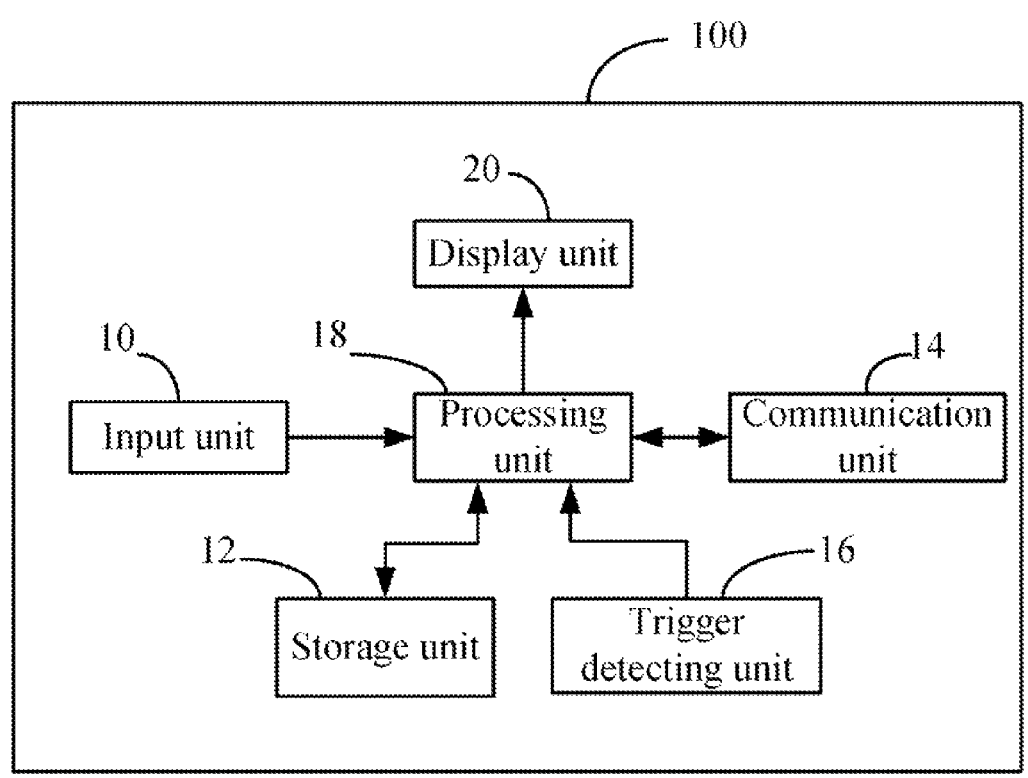
FIG. 1 is a block diagram of an electronic device in accordance with an exemplary embodiment.

Referring to FIG. 1, an electronic device 100 includes an input unit 10, a storage unit 12, a communication unit 14, a trigger detecting unit 16, a processing unit 18, and a display unit 20.

The input unit 10 is configured for receiving user input. The input unit 10 may be, for example, any one or more of a keypad, a touch pad, and a voice recognition module.

The storage unit 12 stores a to-do list recording a number of to-do items respectively associated with user-selected trigger conditions. In this embodiment, the user-selected trigger conditions may include images, voice signals, or primary identifications of certain electronic devices (not shown), such as those having BLUETOOTH modules. The primary identifications of the certain electronic devices are pre-existing in the certain electronic devices and contain information of the type of the certain electronic devices.

The communication unit 14 is configured to receive wireless signals from a base station (not shown) to communicate the electronic device 100 with other electronic devices (not shown).

The trigger detecting unit 16 is configured to receive input and transfer information of the input to the processing unit 18 to determine if one user-selected trigger condition has occurred. The trigger detecting unit 16 may be a camera, a voice receiver able to receive voice transmissions from an electronic device communicating with the electronic device 100 through the communication unit 14, a microphone, or a BLUETOOTH module. If the trigger detecting unit 16 is a camera, then images of an area in view of the camera are periodically captured. Each image can then be transferred to the processing unit 18 and examined for one trigger condition using object recognition algorithms for example. If the trigger detecting unit 16 is a voice receiver, then voice signals of received voice transmissions are transferred to the processing unit 18 and examined for one trigger condition. If the trigger detecting unit 16 is a microphone, then voice signals received by the microphone are transferred to the processing unit 18 and examined for one trigger condition. If the trigger detecting unit 16 is a BLUETOOTH module, then primary identifications of electronic devices having BLUETOOTH modules are detected, and each detected primary identification is transferred to the processing unit 18 and examined for one trigger condition.

The processing unit 18 is configured to compare the information of the received input from the trigger detecting unit 16 with the previously stored user-selected trigger conditions. If there is a match, the processing unit 18 displays the item associated with the trigger condition on the display unit 20, and outputs predetermined prompt content. The predetermined prompt content may be a ringtone, mechanical vibration of the electronic device 100, or the like.

With such configuration, the electronic device 100 can prompt users to do a list of things according to detected conditions other than time. For example, when using a BLUETOOTH module as the trigger detecting unit 16, a user may want to be reminded to ask a friend to return a borrowed item the next the user sees that friend. So the trigger condition associated with that to-do item would be the primary ID of the friend's mobile phone.

Figure 2:
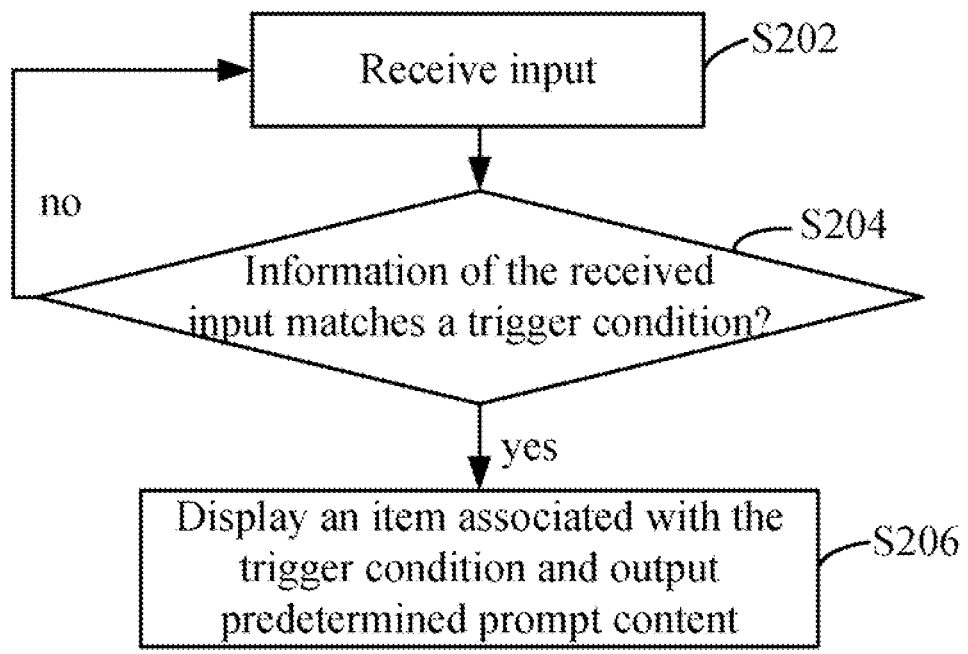
FIG. 2 is a flowchart of a prompt method in accordance with an exemplary embodiment.

Referring to FIG. 2, a flowchart of a prompt method in accordance with an exemplary is illustrated.

In step S202, the trigger detecting unit 16 receives input and transfers information of the input to the processing unit 18. In this embodiment, the trigger detecting unit 16 may be a camera, a voice receiver able to receive voice transmissions from an electronic device communicating with the electronic device 100 through the communication unit 14, or a BLUETOOTH module. If the trigger detecting unit 16 is a camera, then images of an area in view of the camera are periodically captured. Each image can then be transferred to the processing unit 18 and examined for one trigger condition using object recognition algorithms for example. If the trigger detecting unit 16 is a voice receiver, then voice signals of received voice transmissions are transferred to the processing unit 18 and examined for one trigger condition. If the trigger detecting unit 16 is a microphone, then voice signals received by the microphone are transferred to the processing unit 18 and examined for one trigger condition. If the trigger detecting unit 16 is a BLUETOOTH module, then primary identifications of electronic devices having BLUETOOTH modules are detected, and each detected primary identification is transferred to the processing unit 18 and examined for one trigger condition.

In step S204, the processing unit 18 compares the information of the received input from the trigger detecting unit 16 with the user-selected trigger conditions stored in the storage unit 12. The user-selected trigger conditions may include images, voice signals, or primary identifications of certain electronic devices (not shown), such as those having BLUETOOTH modules. If there is a match, the procedure goes to step S206, otherwise, the procedure returns to step S202.

In step S206, the processing unit 18 displays the item associated with the trigger condition on the display unit 20, and outputs the predetermined prompt content. In this embodiment, the to-do list recording a number of to-do items is stored in the storage unit 12. Each item is associated with one user-selected trigger condition. The predetermined prompt content may be a ringtone, mechanical vibration of the electronic device 100, or the like.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device with a prompt function, comprising:
   a display unit;
   a storage unit storing a to-do list recording at least one item and at least one trigger condition, each of the at least one item being associated with one of the at least one trigger condition, each of the at least one trigger condition being an image;
   a trigger detecting unit configured to receive input, the trigger detecting unit being a camera; and
   a processing unit configured to compare information of the received input from the trigger detecting unit with the at least one trigger condition, and further configured to display the item associated with the one of the at least one trigger condition on the display unit and output predetermined prompt content if the information of the received input matches one of the at least one trigger condition, the received input from the trigger detecting unit being each of images of an area captured by the camera periodically.

2. The electronic device as described in claim 1, further comprising an input unit configured to input the to-do list.

3. The electronic device as described in claim 1, wherein the predetermined prompt content is a ringtone.

4. The electronic device as described in claim 1, wherein the predetermined prompt content is mechanical vibration of the electronic device.

5. The electronic device as described in claim 1, wherein the predetermined prompt content is a ringtone and mechanical vibration of the electronic device.

6. A prompt method, comprising:
   providing a storage unit storing a to-do list recording at least one item and at least one trigger condition, each of the at least one item being associated with one of the at least one trigger condition, each of the at least one trigger condition being an image;
   receiving input, the received input being each of images of an area captured periodically;
   comparing information of the received input with the at least one trigger condition; and
   displaying the item associated with the one of the at least one trigger condition and outputting predetermined prompt content if the information of the received input matches one of the at least one trigger condition.

7. The method as described in claim 6, wherein the predetermined prompt content is a ringtone.

8. The method as described in claim 6, wherein the predetermined prompt content is mechanical vibration.

9. The method as described in claim 6, wherein the predetermined prompt content is a ringtone and mechanical vibration.

* * * * *